UNITED STATES PATENT OFFICE.

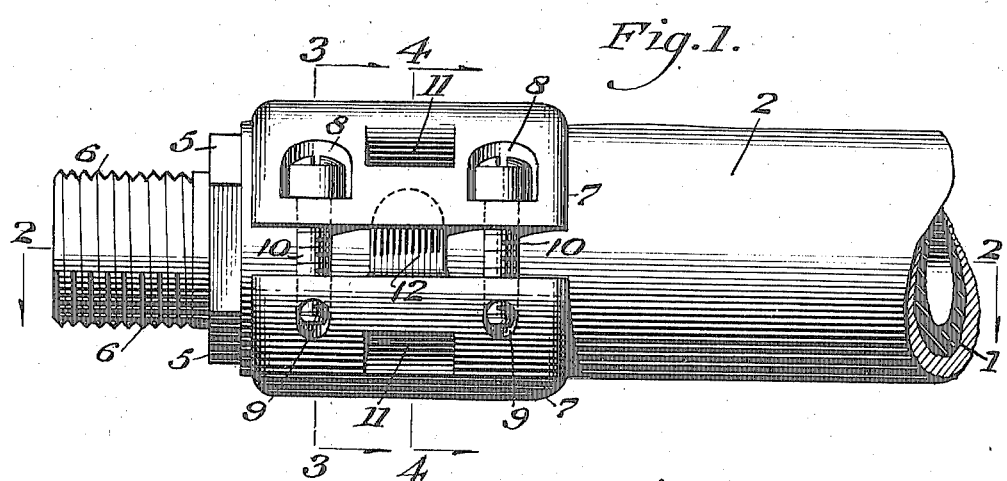
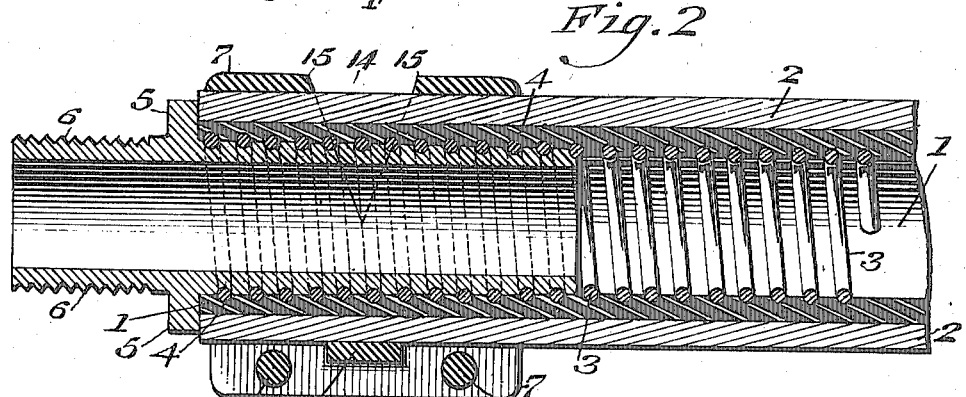
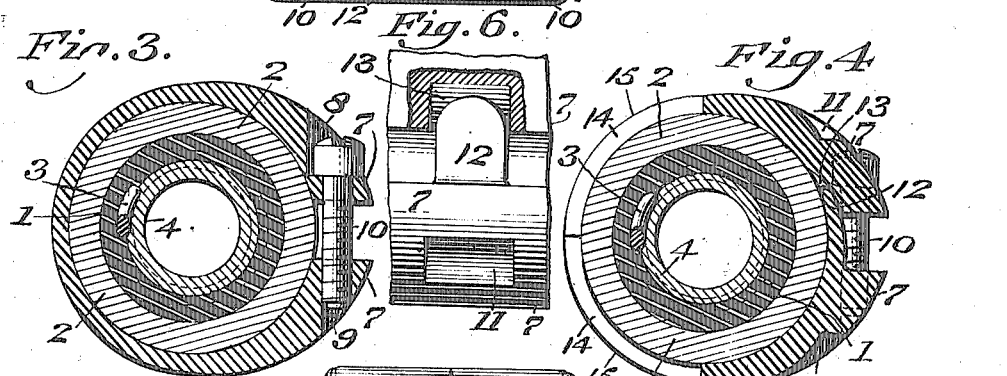
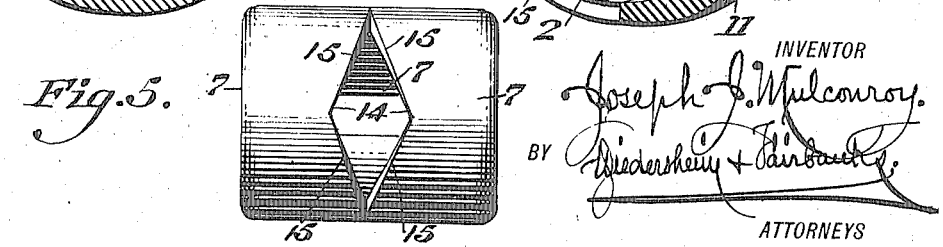

JOSEPH J. MULCONROY, OF PHILADELPHIA, PENNSYLVANIA.

HIGH-PRESSURE HOSE-COUPLING.

1,286,388.   Specification of Letters Patent.   Patented Dec. 3, 1918.

Application filed December 19, 1917. Serial No. 207,830.

*To all whom it may concern:*

Be it known that I, JOSEPH J. MULCONROY, a citizen of the United States, residing in the city and county of Philadelphia, State of Pennsylvania, have invented a new and useful High-Pressure Hose-Coupling, of which the following is a specification.

My invention consists of a novel coupling for a hose which is subjected to a high pressure and adapted more particularly for cleaning steam boiler flues or tubes to remove scale therefrom, it being devoid of lugs, collars, flanges, washers, etc., and possessing tightness of joint, strength and simplicity of construction, and other advantages as will be hereinafter set forth.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a side elevation of a hose coupling embodying my invention.

Fig. 2 represents a longitudinal section thereof on the line 2—2 Fig. 1.

Fig. 3 represents a transverse section thereof on line 3—3 Fig. 1.

Fig. 4 represents a transverse section on line 4—4 Fig. 1.

Fig. 5 represents a plan view of the clamp member of the coupling.

Fig. 6 represents a plan view of a portion of said member partly cut-away.

Similar numerals of reference indicate corresponding parts in the figures.

Referring to the drawings.

1 designates a hose proper which in the present case is formed of rubber having an exterior sheathing 2, and an interior spiral 3 of wire, the latter being partly embedded in the inner circumference of said rubber hose forming in a measure a thread.

4 designates a stem or thimble. In the exterior of said stem is a spiral channel which is adapted to receive the projecting portions of the convolutions of the spiral wire 3, the stem thus being adapted to be screwed into the end portion of the hose by the spiral which latter forms a thread as has been stated, it being seen that the surfaces of said stem between its channels rest solidly flat against the surfaces of the hose between the projecting portions of the convolutions of the spiral so that the hose is sustained on both the spiral and the flat portions of the stem between the latter forming a primary firm connection for the hose with the stem, and sustaining the hose both on the latter and on the spiral and avoiding a cutting compression of the hose on the stem, said stem having thereon at the open end of the hose, the hexagonal collar 5 adapted to enable the stem to be screwed into the hose and tightened against the end of the same and removed from the hose when so desired.

Connected with said collar in the longitudinal direction of the hose is the threaded nipple 6 for the connection therewith of a member of a nozzle or other member of a flue cleaner or other article to which it is desired to attach the hose.

The invention will be hereinafter described as applied to a flue-cleaner. Encircling the terminal portion of the hose is the clamp 7 which consists of a divided or split sleeve which is adapted to embrace the terminal portion of the hose. The terminal portions of the divided wall of the clamp gradually increase in thickness from the main body of the clamp to the terminals, while the interior concentric surface of the clamp is preserved, as most plainly shown in Fig. 4.

In one terminal portion are the countersunk openings 8, and in the opposite terminal portion are the threaded openings 9, said openings being in register to receive the screw bolts 10 whose heads are adapted to be seated in the countersunk openings 8, and whose threaded ends are adapted to be screwed into the threaded openings 8, whereby when said bolts are properly rotated said terminals are drawn together whereby the clamp will tightly close on the hose and compress it against the stem 4, thus firmly connecting the latter with the hose and vice versa.

The heads of the bolts occupy the countersunk portions of the openings 8, and the threaded shanks pass freely through smooth portions of said opening into the threaded openings 9 so as to engage the threads of the latter.

In the outer periphery of the clamp near the opposite screw openings 8 and 9 are the indents 11 which are adapted to be engaged by vise-jaws for more powerfully closing the clamp upon the hose. On the edge of one of the terminals of the clamp 7 is the tongue 12 which projects toward the opposite terminal in the edge of which latter is the groove 13 which when the clamp is compressed and so contracted, is adapted to receive said tongue and so form a bridge for the clamp at its division from one terminal to the opposite terminal, providing a continuity of the clamp around the hose so that in the main the clamp will bind with equal force on the hose around the contiguous portion of the same, and guide said terminals in the closing of the clamp. The clamp has therein the recess 14 whose edges 15 on the exterior thereof are comparatively sharp and adapted to scrape the interior of the flues or tubes with which they come in contact in working the device through said flues or tubes.

When the bolts 10 are properly rotated the clamp is contracted and so closed tightly upon the hose taking firm hold thereof with an even grip. The hose is also pressed against the stem 4 causing the spiral wire 3 as threads to be forced into the channels of said stem as an additional holding element for the latter. The interior of the clamp is primarily eccentric whereby the clamp can be closed to a greater extent on the hose and the stem 4 is tapering in the direction of its length, allowing the inner surface of the hose to make a firm contact with said stem and allow the spiral wire 3 to rest tightly in the spiral passages formed by the convolutions of said wire.

It will be seen that I provide a coupling for the hose with members of a flue or tube cleaner, the same having a tight and permanent joint therewith, the coupling being comparatively round of small diameter, its surface being smooth and having no projecting lugs, flanges or other parts. It is strong and durable and formed of few parts, and so is simple and inexpensive in construction. The clamp presses uniformly on the hose and its bolts require no nuts which are liable to loosen or break off. Owing to the walls of the terminal portions of the clamp being of greater diameters or thicknesses than the diameter of the wall of the remainder of the body of the clamp, the exterior of the latter becomes eccentric but the interior of the clamp remains concentric, and said terminals are vastly strengthened even with the openings 8 and 9 therein, and the exterior surface of the clamp is smooth in circular direction, while projecting lugs therein for the engagement of the tightening bolts are avoided.

The recess 14 in the clamp reduces the weight of the latter and adds to the flexibility of the same and so it may bind evenly around the hose. When the nozzle of a scraper or cleaner for a boiler flue or tube is connected with the nipple 6, the device may be inserted into said flue or tube, and then worked to and fro while steam or other suitable material may be injected into the flue or tube, and the latter be scraped by the edges 15 of the recess 14, and thus scale on the tube or flue may be removed effectively as is evident.

The recess 14 is preferably of diamond, rhomboidal, or other geometric form whereby the lengths of the scraping edges are of increased lengths.

In practice the clamp will be of slightly less diameter than that of the flue or tube that is being scraped, so that the device can be properly manipulated in the flue or tube to cause efficient scraping thereof.

The surfaces of the convolutions on the portion of the stem within the hose are flat, as shown in Fig. 2, whereby they will bear flat against the inner wall of the hose without cutting the same, while the interior portions of the convolutions of the spiral 3 enter the channels between the convolutions thereof, while the exterior portions thereof are embedded in said inner wall of the hose, thus firmly connecting said stem with the hose, and vice versa.

Having thus described my invention what I claim as new and desire to secure by Letters Patent, is:—

1. In a hose coupling of the character stated, a thimble, a hose having a portion encircling said thimble, a spiral member interposed between said hose-portion and thimble and partially embedded therein and partially projecting to form flat surfaces, spaced apart, between the convolutions of said spiral member on the hose and thimble, and a clamp embracing said hose-portion for holding the parts in position, with its holding means disposed within the exterior confines of the clamp.

2. In a coupling of the character stated, a thimble with a spiral channel in the exterior thereof, a hose having a portion adapted to encircle said thimble and having a spiral channel on its interior, a spiral member interposed between said hose-portion and said thimble, said member being partially embedded in the channels of the hose and thimble and partially projecting outside of the same leaving flat surfaces between the convolutions of the member on the hose and thimble solidly in contact with each other, and a clamping device around said hose-portion.

3. In a coupling of the character stated, a thimble, a hose having a portion into which said thimble is insertible and adapted to be connected therein, and a divided clamp, the terminal portions of the walls of the division gradually increasing in diameters from the wall of the remaining portion of the clamp to the terminals of the division, said portion having registering openings therein and bolt-like members in said openings for closing said terminal portions.

4. In a hose coupling of the character stated, a clamp applicable to the hose on the exterior thereof, said clamp having therein a recess, an edge thereof on the exterior of the clamp comprising a scraper.

5. In a hose coupling of the character stated, a clamp applicable to the hose on the exterior thereof, the same being composed of a divided sleeve, bolt-like members fitted to the opposite terminals of said sleeve and countersunk into the wall of the latter, and indents in the exterior of the clamp for engagement therein of vise-jaw members.

6. In a hose coupling of the character stated, a hose, an interior stem connectible with the wall thereof, a clamp applicable to the hose on the exterior thereof around said stem, said clamp being composed of a divided sleeve, and means disposed substantially within the confines of said clamp for closing the same and tightly compresing it on the hose, said stem being provided on its outer portion with a member adapted for the attachment thereto of a flue cleaning device and on its exterior with means for tightening said stem to the adjacent end portion of the hose.

JOSEPH J. MULCONROY.

Witnesses:
 JOHN A. WIEDERSHEIM,
 M. BUSSINGER.